No. 633,004. Patented Sept. 12, 1899.
D. HOGAN.
BED AND DOUCHE PAN.
(Application filed Aug. 25, 1898.)

(No Model.)

WITNESSES:
E. Wolff
Chas. E. Poensgen

INVENTOR
Daniel Hogan.
BY
Hauff & Hauff
ATTORNEYS

THE NORRIS PETERS CO., PHOTO-LITHO., WASHINGTON, D. C.

United States Patent Office.

DANIEL HOGAN, OF NEW YORK, N. Y.

BED AND DOUCHE PAN.

SPECIFICATION forming part of Letters Patent No. 633,004, dated September 12, 1899.

Application filed August 25, 1898. Serial No. 689,489. (No model.)

*To all whom it may concern:*

Be it known that I, DANIEL HOGAN, a citizen of the United States, residing at New York, in the county and State of New York, have invented new and useful Improvements in Bed and Douche Pans, of which the following is a specification.

This invention resides in certain novel features of construction set forth in the following specification and claim and illustrated in the annexed drawings, in which—

Figure 1:
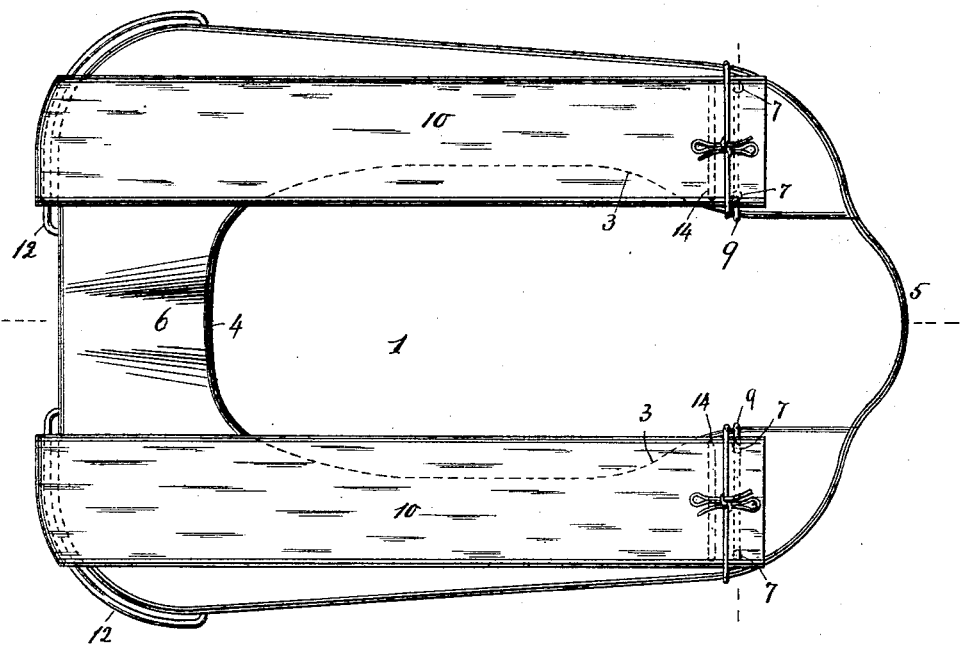
Figure 2:
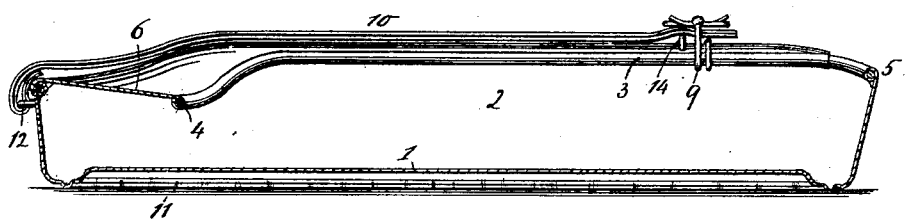
Figure 3:
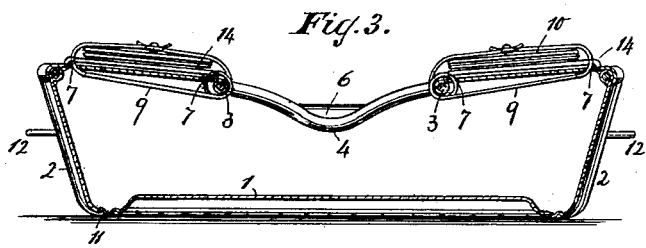
Figure 4:
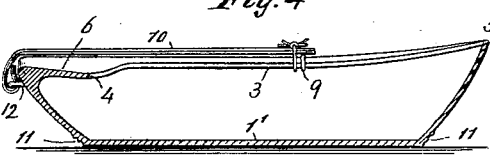

Figure 1 is a plan view of the bed-pan. Fig. 2 is a longitudinal section of Fig. 1. Fig. 3 is a transverse section of Fig. 1. Fig. 4 shows a modification.

The pan is shown with its bottom at 1, its sides at 2, and its rim at 3 4 3, the top of the pan being open. The rim portions 3, as seen in Fig. 1, are extended along into spout 5 to leave the latter open at the top. The pan when in use has its rim portion 4 or the top face 6 contiguous to said rim portion 4, supporting the user's spine, and said rim portion 4 being elevated from the pan-bottom 1 will keep the spine or the person of the user out of contact with the pan-bottom or contents. The bottom, sides, and rim portions of the pan being made to curve or round into one another at the entire interior of the pan corners or contracted spaces which would be difficult of access or cleaning are avoided. The pan can thus be readily kept clean or neat or effectively emptied.

The rim is shown with perforations 7 extended through the rim into the pan-space, as seen in Fig. 3. These perforations serve for the reception of strings or fastenings 9, securing pads or softenings 10. The strings and pads can be readily detached, as may be required, for cleaning, and these pads 10 can be readily formed by towels or suitable soft articles ready to hand.

As seen in Fig. 3, by making the rim at the spine-supporting portion 4 with a concaved or depressed face 6 the spine will be kept clear and distress or pressure avoided, the pads 10 forming a soft support for the buttocks. The pan-bottom 1 being flat will form a firm or level support, and by having the exterior and interior of the pan smooth or glazed cleanliness is readily assured. To avoid slipping of the pan in the bed, the bottom 1 is practically surrounded or edged by a roughened or non-glazed or non-slipping ring or portion 11, which secures a grip or friction against the bedclothes to avoid displacement of the pan while in use. If seen fit, this roughening 11 can be omitted.

When the pan is in use, the base of the spine resting over rim portion 4 and the spout 5 being under or between the thighs of the user, the person of the user, as seen, is kept clear from bottom 1, and the spout 5, open at top, allows the nurse or attendant to gain access to the person of the user while the latter is on the vessel. Necessary operations—as, for example, cleaning or douching—can thus be performed without the pan having to be removed, and fluid contents can be withdrawn from the pan, as by a syringe applied at spout 5, while the pan remains in the bed or in use. The annoyance and complication of so-called "drainage-tubes" are thus avoided. The open-top spout 5 also enables the pan to be readily employed by a male as a urinal.

The pan can of course be made of any suitable material. The strings 9 are preferably tied or passed about in the holes 7 before the pads 10 are laid in place, as the strings if simply looped through the holes might slip about and allow displacement of the pad. The edge portions 3 are rounded or sharp edges avoided, so that even if the pads 10 are omitted cutting or distress is avoided.

The pad or softening 10 is shown at the rear looped about or secured to a bail or wire 12, and in place of the holes 7 a similar bail or loop 14 could be used to secure or tie the front of the pads. To secure a flat or smooth position of the pads, the loop 14 is generally omitted and eyes 7, with strings 9, used, as shown. Such loop 14, however, is not apt to cause inconvenience, because the weight of the patient or user rests back of such loops 14.

The bottom instead of being formed as in Fig. 3 could be formed as shown at 1', Fig. 4, with the gripping or non-glazed portion 11 extended about such bottom.

What I claim as new, and desire to secure by Letters Patent, is—

A bed-pan having the exterior of its bottom smooth and unobstructed and a roughened portion above and surrounding the bottom, substantially as described.

In testimony whereof I have hereunto set my hand in the presence of two subscribing witnesses.

DANIEL HOGAN.

Witnesses:
W. C. HAUFF,
E. F. KASTENHUBER.